United States Patent [19]

Mazziotti

[11] Patent Number: 4,865,470
[45] Date of Patent: Sep. 12, 1989

[54] INTERMEDIATE BEARING SUPPORT FOR A DRIVE SHAFT

[75] Inventor: Philip J. Mazziotti, Toledo, Ohio

[73] Assignee: The Zeller Corporation, Defiance, Ohio

[21] Appl. No.: 261,618

[22] Filed: Oct. 24, 1988

[51] Int. Cl.[4] .................... F16C 33/76; F16C 27/06
[52] U.S. Cl. ................................ 384/478; 384/536
[58] Field of Search ............ 384/478, 535, 536, 581, 384/582, 135

[56] References Cited

U.S. PATENT DOCUMENTS

| | | | |
|---|---|---|---|
| 2,165,155 | 7/1939 | Schmal | 384/536 |
| 2,661,986 | 12/1953 | Herbenar | 384/536 |
| 2,930,660 | 3/1960 | Dunn | 384/536 |
| 3,309,154 | 3/1967 | Stokely | 384/536 |
| 3,756,675 | 9/1973 | Mangiavacchi | 384/536 |
| 4,392,694 | 7/1983 | Reynolds | 384/536 |

Primary Examiner—Thomas R. Hannon
Attorney, Agent, or Firm—Allen D. Gutchess, Jr.

[57] ABSTRACT

An intermediate bearing support for a drive shaft of a vehicle is set forth. An intermediate drive shaft support is required when three or more universal joints are embodied in a drive line between a transmission and a differential. The new drive shaft support is more compact, uses fewer parts which is brought about in part by the use of symmetrical designs, and is easier to assemble on a drive shaft. Bearing shields or flingers of the support are mounted on the drive shaft adjacent a bearing of the support so that the shields do not have to be specially designed to fit particular drive shafts. For replacement purposes, one replacement kit can be used to rebuild a number of different drive shaft bearing supports.

11 Claims, 2 Drawing Sheets

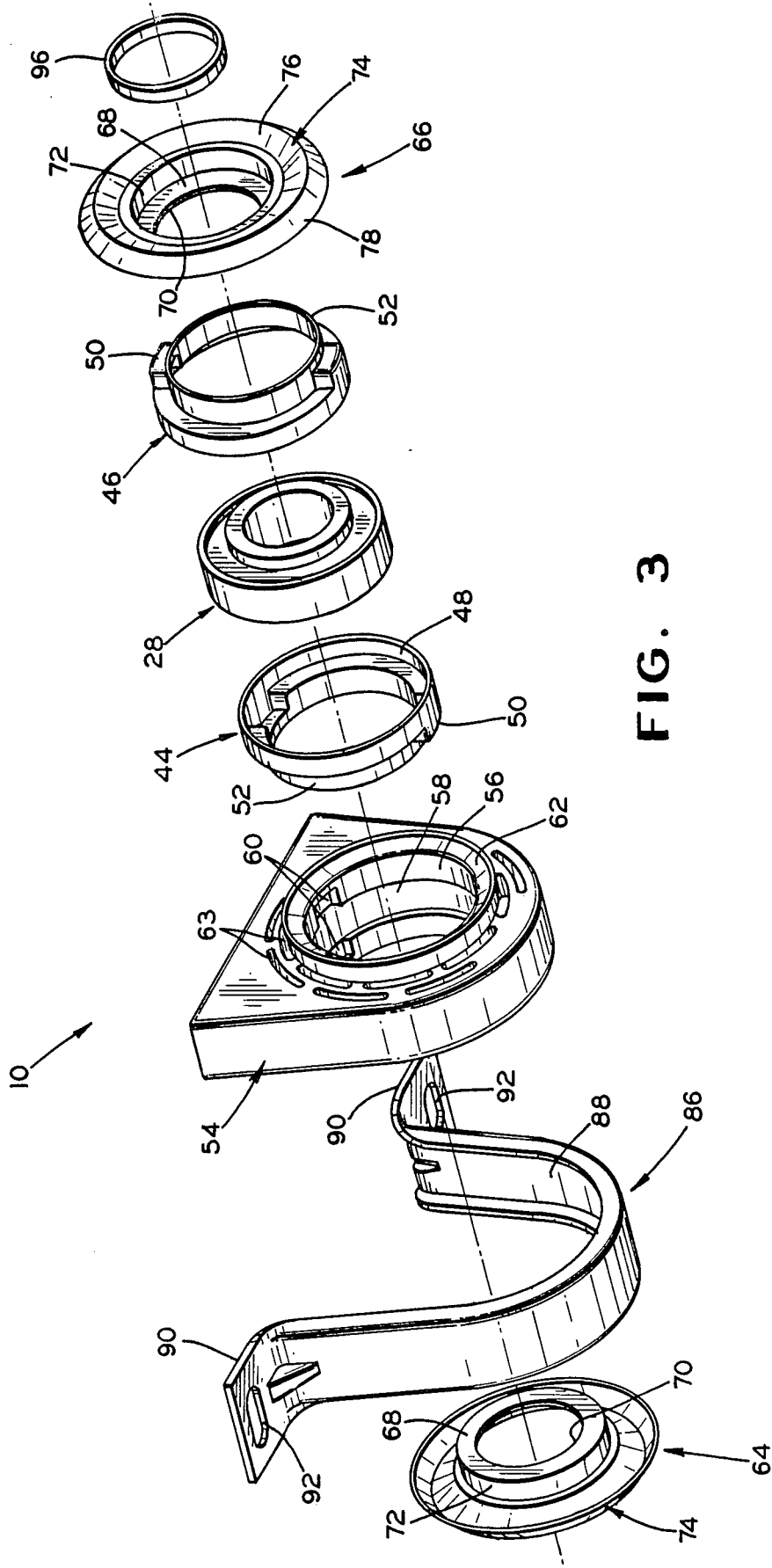

INTERMEDIATE BEARING SUPPORT FOR A DRIVE SHAFT

This invention relates to an intermediate bearing support for a drive shaft and to a replacement kit embodying same.

In some drive lines, three or more universal joints are required between the transmission and the rear axle differential because a single, straight shaft cannot be used. Also, particularly in larger vehicles, the drive or propeller shaft may be sufficiently long that it tends to flex or whip to an objectionable extent. In either of these applications, an intermediate bearing support for the drive line is employed.

An intermediate bearing support for a drive shaft commonly includes a ball bearing with an inner race mounted on the shaft, a grease retainer around an outer race of the bearing, a cushion block around the grease retainer, and a hanger located around the cushion block and being mounted on suitable framework of the vehicle. Bearing shields or flingers are located on each side of the roller bearing. Heretofore, the bearing shields have been mounted on spaced portions of the drive shaft and must be specially designed for each particular shaft.

The new intermediate drive shaft support has certain components designed symmetrically for easier manufacturing and for facilitating assembly of the support on a shaft, with less chance for error. Also, with the symmetrical design of certain components, fewer different components are required. In the new drive shaft support, the bearing shields or flingers are mounted on the drive shaft in contiguous relationship with the inner face of the ball bearing so that the flingers will fit any shaft that the bearing will. Consequently, with the overall design, one drive shaft support replacement kit can be used to rebuild drive shaft supports of a number of different designs. A smaller inventory of replacement kits is thereby achieved and there is less chance of obtaining the wrong kit when rebuilding a shaft support.

It is, therefore, a principal object of the invention to provide a drive shaft support or replacement kit which is capable of being used to rebuild drive shaft supports of a number of different designs. Another object of the invention is to provide a drive shaft support using more symmetrical components for ease in manufacture and less chance for errors in assembly.

Still another object of the invention is to provide a drive shaft support which is more compact and can be mounted on drive shafts of various configurations.

Yet another object of the invention is to provide a drive shaft support with bearing shields located on the shaft immediately contiguous with a bearing of the support.

Many other objects and advantages of the invention will be apparent from the following detailed description of preferred embodiments thereof, reference being made to the accompanying drawings, in which:

FIG. 3 is an exploded view in perspective of the drive shaft support of FIG. 2.

Figure 1:
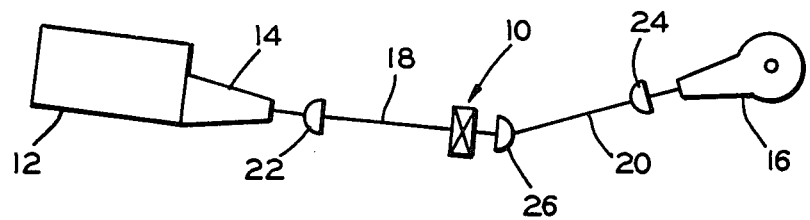
FIG. 1 is a schematic view in elevation of a drive line of a vehicle with which the drive shaft support is used.

Referring to FIG. 1, a drive shaft support 10 is shown in a typical application. Here a vehicle engine 12 with a transmission 14 is connected to a rear axle differential 16 by front and rear drive shafts 18 and 20. A front universal joint 22 connects the shaft 18 with the transmission 14 and a rear universal joint 24 connects the rear drive shaft 20 with the differential 16. The shafts 18 and 20 are connected by an intermediate universal joint 26. The drive shaft support 10 is required to provide an intermediate support for the drive shafts and specifically supports the rear portion of the front drive shaft 18 near the intermediate universal joint 26. The drive shaft supports 10 are also used on single, straight drive shafts when of substantial length, to prevent excessive flexing or whipping.

Figure 2:
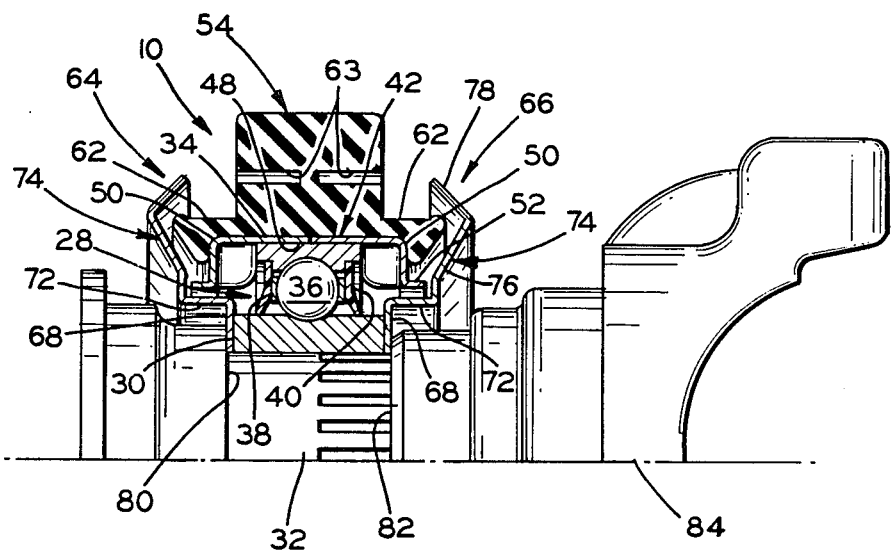
FIG. 2 is an enlarged view in transverse cross section of one-half of the drive shaft support of FIG. 1, with a drive shaft component shown in elevation.

Referring to FIGS. 2 and 3, the shaft support 10 includes a commercially-available bearing 28 having an inner race 30 which is mounted with a press-fit on a stub shaft 32 forming an end portion of the drive shaft 18. The bearing further includes an outer race 34, bearing elements 36, shown as bearing balls, a cage 38, and an inner grease retainer 40. An outer grease retainer 42 is made of two symmetrical halves 44 and 46 (FIG. 3). These form an annular recess 48 with radially-extending tabs 50 and outwardly-extending annular flanges 52.

A molded rubber cushion block 54 surrounds the bearing 28 and the outer grease retainer 42 and isolates the bearing and shaft from the vehicle frame. The cushion block has a central opening 56 with an annular recess 58 which receives the outer grease retainer 42. The block also has recesses 60 which receive the tabs 50 of retainer halves 44 and 46 to prevent the retainer from rotating relative to the block. The cushion block 54 also has annular outwardly-extending flanges 62 which provide some protection against dirt and dust for the bearing 28. Staggered, arcuate slots or recesses 63 are also molded into the cushion block to provide more effective isolation of the bearing 28 and the shaft from the vehicle frame, as is known in the art.

The bearing support 10 further includes outer bearing shields or flingers 64 and 66 which provide further protection for the bearing 28 from dust, dirt, and water. These shields are also symmetrical to reduce die costs and inventory and also to reduce the chance for errors in assembling the support on a shaft. Each of the shields 64 and 66 includes a radially-extending, mounting flange 68 having a circular opening 70 with a diameter substantially equal to the inner diameter of the inner race 30 of the bearing 28. The shields further have outwardly-extending flanges 72 which extend in the direction of the stub shaft 32 beyond the edges of the outer grease retainer 42. Annular protective flanges 74 extend generally radially outwardly from the outer extremities of the flanges 72. As shown, these have inner portions 76 extending away from the cushion block flanges 62 and outer portions 78 which extend back inwardly toward the cushion block 54 and over the flanges 62 to provide greater protection against dirt, dust, and water for the bearing 28. The design of the shields 64 and 66 also makes the overall support 10 more compact, particularly in a longitudinal direction relative to the shaft 32.

The one mounting flange 68 is held between an annular edge portion of the inner race 30 and a shoulder 80 on the stub shaft 32. The other mounting flange 68 is located between an edge portion of the inner race 30 and an end 82 of a yoke 84 forming part of the universal joint 26. The yoke is mounted on the end of the stub shaft 32 by a bolt and nut arrangement (not shown) to draw the yoke 84 onto the shaft 32 and to hold the mounting flange 68 in position.

The shields 64 and 66 can be mounted on substantially any shaft on which the inner race 30 of the bearing 28 can be mounted. Further, the mounting flanges 68 are sufficiently wide that the flanges 72 of the shields will clear most shoulders which might be encountered on particular drive shafts or stub shafts. The contour of the shields 64 and 66 also aid in the compact design of the support 10, particularly with respect to the longitude of the shaft 32. The bearing support 10 thus can be adapted for use on a wide variety of shafts which heretofore have required a large number of different replacement kits.

A bracket or hanger 86 (FIG. 3) of U-shaped configuration has a groove 88 to receive the periphery of the cushion block 54 and has mounting flanges 90 with elongate openings 92 by means of which the hanger and the support 10 can be adjustably mounted relative to a vehicle frame. In some instances, an elongate mounting plate is used between the mounting flanges 90 and above the upper edge of the cushion block 54, as is known in the art.

Figure 4:
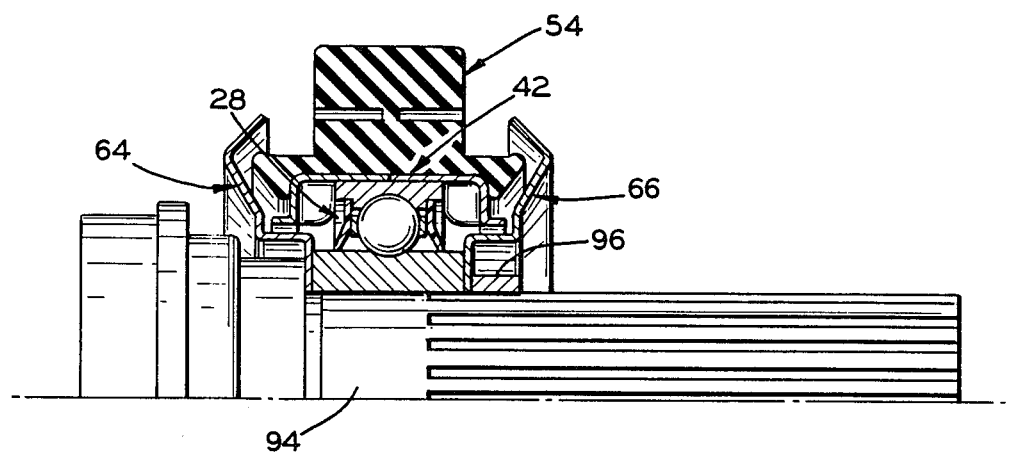
FIG. 4 is a view similar to FIG. 2 of a slightly modified drive shaft support.

On some stub shafts, the protective shields 64 and 66 cannot be held against the inner race of the bearing by means of the universal joint yoke 84 or the like. In such an instance, as on a stub shaft 94 of FIG. 4, a retaining collar 96 is employed with a press fit to mount the components on the shaft. For the purpose, the replacement kit can include the retainer collar 96 to provide an even greater versatility in the replacement applications which the replacement kit can accomodate.

From the above, it will be seen that with the shields 64 and 66 mounted in contiguous relationship with the bearing inner race 30, specially designed shields need not be employed which have been necessary heretofore when the shields have been mounted on shoulders or other areas of the shaft with which the support is used. This required much greater inventory, and, if the wrong shields were received by the mechanic, such shields were often left off of the replacement shaft support entirely. Further, with the symmetrical support components, errors in assembly are greatly reduced and manufacturing costs are also decreased.

Various modifications of the above-described embodiments of the invention will be apparent to those skilled in the art and it is to be understood that such modifications can be made without departing from the scope of the invention, if they are within the spirit and the tenor of the accompanying claims.

I claim:

1. A shaft support for a drive of a drive line of a vehicle, said shaft support comprising an inner race having an inner diameter of predetermined value, an outer race, and bearing elements therebetween, a grease retainer of generally U-shaped tranverse cross section around said outer race, a resilient cushion member extending around said retainer, said cushion member having annular flanges extending away from said retainer, a supporting bracket extending around said cushion member and having means to attach said bracket to a portion of the vehicle, two flingers, one located on each side of said inner race, each of said flingers having an inner mounting flange having a circular inner edge of a diameter substantially equal to said inner diameter of said inner race, said mounting flange being positioned adjacent an annular edge of said inner race, and a protective flange extending outwardly beyond said outer race in a generally radial direction from the shaft, said protective flange of each of said flingers extending outwardly beyond said grease retainer and the corresponding annular flange of said cushion member having an outer portion extending inwardly toward said cushion member.

2. A shaft support according to claim 1 characterized further by the distance between said outer portions of said protective flanges being less than the distance between the extremities of said annular flanges of said cushion member.

3. A shaft support according to claim 1 characterized by each of said flingers further having an annular flange extending away from an outer extremity of said mounting flange and being structurally integral therewith, said protective flange extending from an extremity of said annular flange of said flinger and being structurally integral therewith.

4. A shaft support according to claim 1 characterized further by a retaining collar having an inner diameter substantially equal to the inner diameter of said inner race and being located adjacent an edge of said inner race with the mounting flange of one of said flingers being positioned therebetween.

5. In combination, a shaft of a drive line of a vehicle, said shaft having an annular, outwardly-extending shoulder, a shaft support for said shaft, said support comprising an inner race affixed to said shaft adjacent said shoulder, an outer race, and bearing elements between said inner and outer races, a grease retainer having a U-shaped tranverse cross section around said outer race, a resilient cushion member extending around said retainer, said cushion member having annular flanges extending outwardly beyond said retainer, a supporting bracket extending around said cushion member and having means to attach said bracket to a portion of the vehicle, two flingers, one located on each side of said inner race, said flingers having inner mounting flanges having circular inner edges of a diameter substantially equal to an inner diameter of said inner race, and protective flanges extending outwardly beyond said outer race, outer edge portions of said protective flanges beyond said annular flanges of said resilient cushion member extending inwardly toward said resilient cushion member, the distance between said outer portions of said protective flanges being less than the distance between the extremities of said annular flanges of said cushion member, one of said mounting flanges being positioned between an edge of said inner race and said shaft shoulder, and means holding the mounting flange of the other flinger adjacent the other edge of said inner race.

6. The combination according to claim 5 characterized by each of said flingers having an annular flange extending from an outer extremity of said mounting flange and being structurally integral therewith, an outer extremity of said annular flange of said flinger extending beyond the corresponding extremity of said retainer, and said protective flange extending outwardly beyond said outer race from the outer extremity of said annular flange and being structurrally integral therewith.

7. The combination according to claim 5 characterized by said means for holding being a retaining ring mounted on said drive shaft.

8. The combination according to claim 5 characterized by said means for holding being another shoulder on said drive shaft.

9. A universal replacement kit to replace a number of special kits for a shaft support for a drive shaft of a drive line of a vehicle, said replacement kit comprising a bearing havaing an inner race with an inner diameter of predetermined value, an outer race, and bearing elements therebetween, two grease retainer halves which, when in face-to-face relationship, form a U-shaped cross section, a resilient cushion member having an opening of a size and shape to encompass outer surfaces of said grease retainer halves when in face-to-face relationship, a support bracket of a size to extend around said cushion member and having means to attach said bracket to a portion of the vehicle, a pair of flingers of symmetrical shape, each having an inner circular mounting flange having a circular inner edge of a diameter substantially equal to said inner diameter of said inner race, and a protective flange extending away from said mounting flange, said protective flange having a first, inner portion extending outwardly and away from said cushion member when in assembled relationship therewith, and a second, outer portion extending outwardly from an outer extremity of said inner portion and back toward said cushion member when in assembled relationship therewith, said inner and outer portions extending around outer extremities of said cushion member when said cushion member and said flanges are in assembled relationship.

10. A replacement kit according to claim 9 characterized by each of said flingers having an annular flange extending from an outer extremity of said mounting flange and structurally integral therewith, siad protective flange extending outwardly from an extremity of said annular flange of said flinger and being structurally integral therewith.

11. A replacement kit according to claim 9 characterized further by said kit having a retaining collar having an inner diameter substantially equal to the inner diameter of said inner race.

* * * * *